(12) United States Patent
Niaura et al.

(10) Patent No.: US 6,460,662 B2
(45) Date of Patent: *Oct. 8, 2002

(54) EXTERNALLY GUIDED DAMPER

(75) Inventors: William S. Niaura; Peyman Pakdel, both of Akron, OH (US)

(73) Assignee: BFS Diversified Products, LLC, Carmel, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/946,985

(22) Filed: Sep. 4, 2001

(65) Prior Publication Data

US 2002/0020593 A1 Feb. 21, 2002

Related U.S. Application Data

(63) Continuation of application No. 09/334,072, filed on Jun. 16, 1999, now Pat. No. 6,318,521.

(51) Int. Cl.[7] .................................................. F16F 9/53
(52) U.S. Cl. ................ 188/267.1; 188/315; 267/140.14
(58) Field of Search .............................. 188/267, 267.1, 188/267.2, 312, 314, 315, 316, 322.17, 322.16; 267/140.14, 140.15

(56) References Cited

U.S. PATENT DOCUMENTS

| 3,104,919 A | | 9/1963 | Dowling et al. | |
| 3,556,617 A | | 1/1971 | Axthammer et al. | |
| 3,722,640 A | * | 3/1973 | Taylor | 188/316 |
| 3,866,724 A | | 2/1975 | Hollnagel | |
| 4,099,602 A | * | 7/1978 | Kourbetsos | 188/312 |
| 4,280,600 A | | 7/1981 | Salmon et al. | |
| 4,896,752 A | | 1/1990 | Shtarkman | |
| 5,000,299 A | | 3/1991 | Goto et al. | |
| 5,014,829 A | | 5/1991 | Hare, Sr. | |
| 5,076,403 A | | 12/1991 | Mitsui | |
| 5,176,368 A | | 1/1993 | Shtarkman | |
| 5,180,145 A | | 1/1993 | Watanabe et al. | |
| 5,259,487 A | | 11/1993 | Petek | |
| 5,277,281 A | | 1/1994 | Carlson et al. | |
| 5,284,330 A | | 2/1994 | Carlson et al. | |
| 5,316,112 A | | 5/1994 | Kimura et al. | |

(List continued on next page.)

FOREIGN PATENT DOCUMENTS

| DE | 25 19 372 A1 | * | 11/1976 |
| DE | 25 40 720 | | 3/1977 |
| DE | 41 41 732 A1 | | 6/1993 |
| DE | 196 08 771 A1 | | 4/1997 |
| EP | 0 025 874 | | 4/1981 |
| GB | 2 255 150 | | 10/1992 |
| JP | 4-277336 | | 10/1992 |
| JP | 6-50375 | | 2/1994 |

Primary Examiner—Jack Lavinder
Assistant Examiner—Thomas J. Williams
(74) Attorney, Agent, or Firm—John M. Vasuta; Michael Sand; Meredith Palmer

(57) ABSTRACT

A vibration damping device is mounted between two spaced portions of a vehicle for absorbing road forces exerted on the vehicle. A cylindrical housing forms an internal piston chamber and is connected at one end to one portion of the vehicle, with an outer end of the rod of a piston which is slidably mounted within the piston chamber, being connected to another portion of the vehicle. A fluid transfer duct is formed between the housing and piston and provides communication between fluid subchambers formed on opposite sides of the piston within the piston chamber. An electrode is attached to either the housing or piston for applying a voltage across the duct to affect the rheological response of an electrorheological (ER) fluid flowing therethrough to provide a controllable mechanism to modify the damping force characteristics of the device. Each end of the piston rod is slidably supported by a slide bushing assembly which is mounted within an end of the housing. The slide bushing assemblies are separated from the ER fluid contained in the fluid chamber by elastomeric seals to reduce bushing wear and deterioration of the ER fluid.

11 Claims, 4 Drawing Sheets

U.S. PATENT DOCUMENTS

| | | |
|---|---|---|
| 5,366,048 A | 11/1994 | Watanabe et al. |
| 5,439,082 A | 8/1995 | McKoewn et al. |
| 5,449,150 A | 9/1995 | Watanabe et al. |
| 5,477,946 A | 12/1995 | Kawamata et al. |
| 5,489,009 A | 2/1996 | Kawamata et al. |
| 5,513,730 A | 5/1996 | Petrovich et al. |
| 5,522,481 A | 6/1996 | Watanabe |
| 5,531,299 A | 7/1996 | Bataille |
| 5,588,509 A | 12/1996 | Weitzenhof et al. |
| 5,590,745 A | 1/1997 | Rensel et al. |
| 5,632,361 A | 5/1997 | Wulff et al. |
| 5,878,851 A | 3/1999 | Carlson et al. |
| 5,947,238 A | 9/1999 | Jolly et al. |
| 5,967,623 A * | 10/1999 | Agnew .................. 303/87 |
| 6,318,521 B1 * | 11/2001 | Niaura et al. ............ 188/267.1 |

* cited by examiner

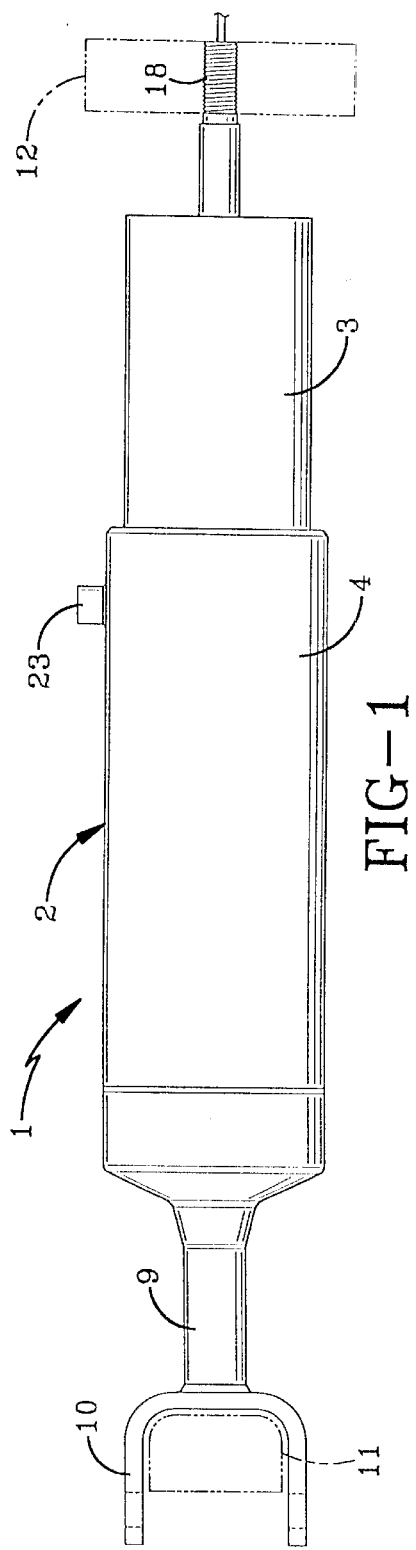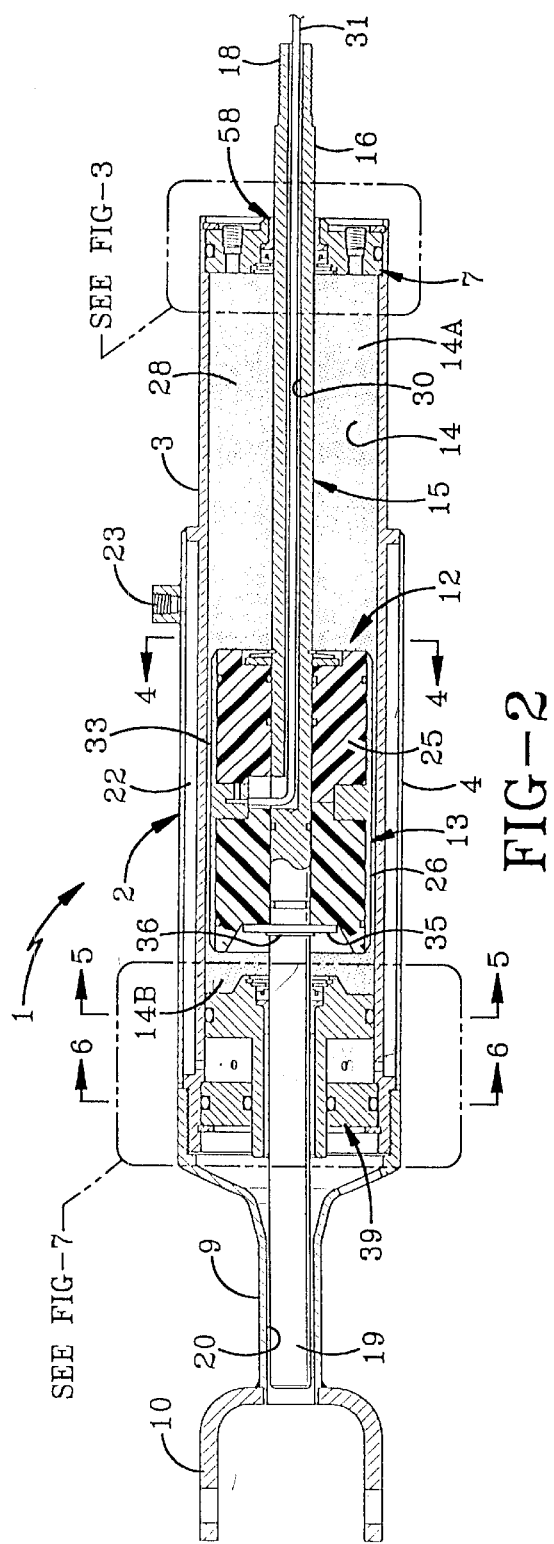

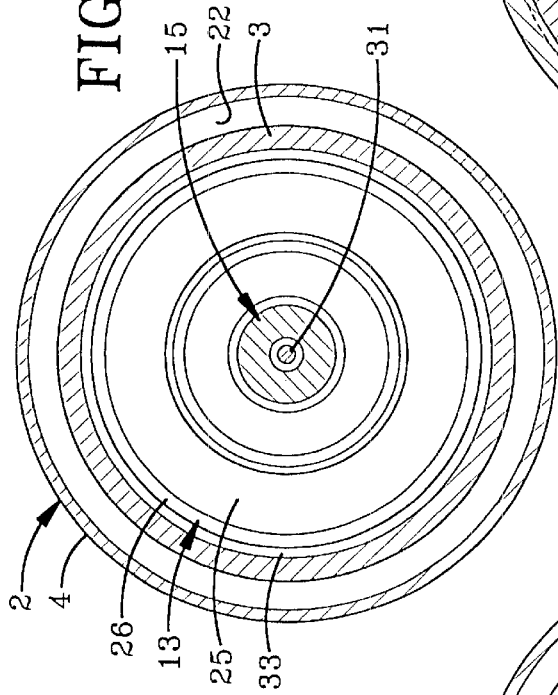
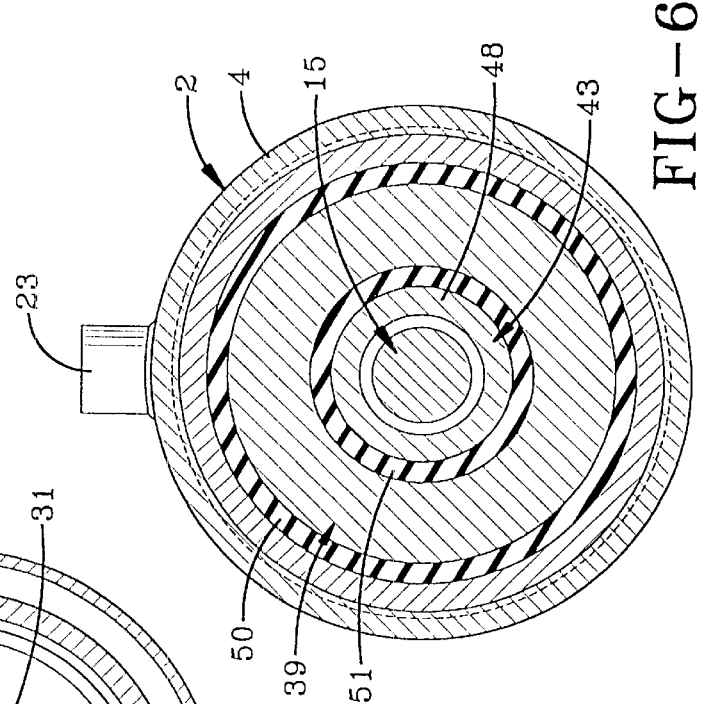
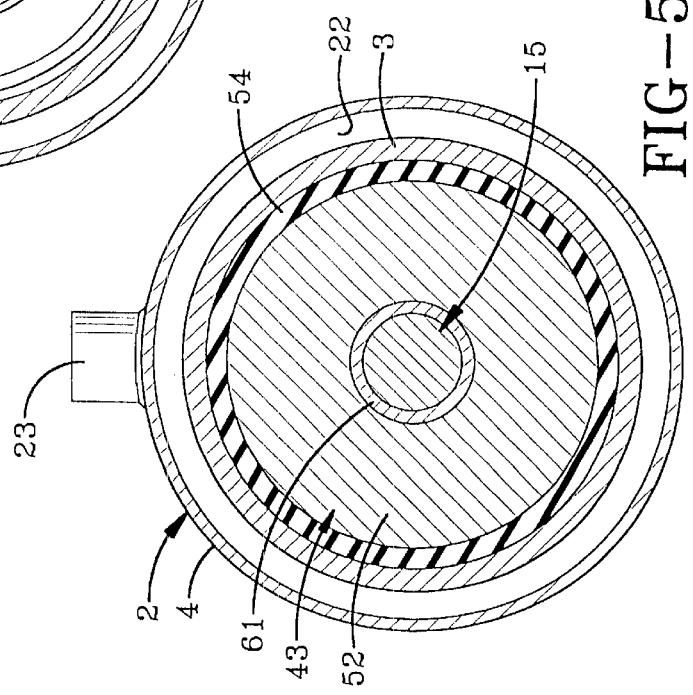

EXTERNALLY GUIDED DAMPER

CROSS REFERENCE TO RELATED APPLICATION

This application is a continuation of currently pending U.S. patent application Ser. No. 09/334,072 filed Jun. 16,1999 now U.S. Pat. No. 6,318,521.

BACKGROUND OF THE INVENTION

1. Technical Field

The invention relates to vibration damping devices which develop damping performance when applied between two moving members such as automobile suspensions or other equipment. More particularly, the invention relates to a damping device using an electrorheological (ER) fluid as the damping medium which uses two piston-rod guide-assemblies for supporting both ends of the piston rod an positioned so the sliding surfaces are not immersed in the ER fluid and are external to the working chamber of the damper.

2. Background Information

In automotive vehicles, vibrations are caused by traveling over road protrusions or depressions and are transmitted from the tire surface to the vehicle frame. Vibration damping devices have been used to dampen these road vibrations and provide a smoother ride in automotive systems. These shock absorbers are typically oil-filled or high-pressure gas-filled damping devices.

Although conventional oil and high-pressure gas damping devices have proven satisfactory, a more recent development has evolved in which an electrorheological or electroviscous fluid is used within the chamber of the damping device. The liquid is in contact with one or more electrodes, usually mounted in a restrictive passage, which depending upon the size of the electrodes and the amount of voltage applied to the liquid, will change the viscosity of the liquid, enabling the damping device to have an adjustable range of damping characteristics.

Typical automobile dampers, be they electrorheological (ER) dampers or conventional dampers, are axially slidable devices that produce a resistive (damping) force as they are compressed or extended. In practical use they are subjected to, and must be able to withstand, bending forces (side-loads) while retaining axial motion. This necessitates that the slidable members be interconnected at a minimum of two sliding bearing-points. In a conventional damper the slidable members are the damper body or housing and the piston/rod assembly. The corresponding bearing points are the rod-guide assembly and the main piston.

The electrorheological fluids used in ER dampers are most often particle/liquid suspensions. In order to function properly the particles must remain physically intact for the service life of the device. Many known ER dampers are constructed similar to conventional dampers described above, that is the piston is one bearing point and the piston rod the second bearing point. This construction may result in a situation which compromises the integrity of the particles in the ER fluid since one of the bearing points is immersed in the ER fluid. As the damper is cycled, the sliding/rubbing motions of the immersed bearing point subject the particles to forces that may be large enough to damage them. The addition of a bending or side-load force only exacerbates the situation. Should the particles used in the ER fluids be abrasive, the sliding/rubbing motions of the bearing point would erode the metal of the damper body. The resulting inclusion of metallic wear debris in the ER fluid is known to degrade the fluid's performance.

Examples of various prior art dampers using ER fluids are shown in U.S. Pat. Nos. 5,522,481; 5,590,745; 5,598,908; 5,259,487. In these structures the piston is supported at only one end and thus it provides a rubbing action against the inner surface of the piston housing within the ER fluid. Furthermore, the piston rod is only supported at one end with the piston itself being the other space support.

U.S. Pat. No. 5,513,730 shows a usual type of hydraulic damper in which the piston rod is supported at opposite ends of the piston to counteract any unequal loading on the piston and piston rod. However, the sliding surfaces between the piston rod and fixed bearing members in this dual supported shock absorber are exposed to the fluid, which is not a problem when used with standard hydraulic fluids. However, if such a construction is used with an ER fluid, it results in the undesirable abrasion at the sliding surfaces. Thus, the need exists for a simple and effective ER damper that provides spaced supports to the piston to eliminate unequal forces exerted on the piston and/or piston rod, and most importantly avoids contact between the sliding-contact surfaces and the ER fluid contained within the fluid chamber.

SUMMARY OF THE INVENTION

Objectives of the invention include providing an improved damping device using ER fluids, preferably of the type suitable for a vehicle suspension system, which solves the aforementioned problems of prior art dampers by reducing the complexity of the damper without sacrificing the damping characteristics achieved thereby, and which is able to withstand the various loads and forces exerted thereon when mounted between spaced components in a vehicle suspension system.

A further objective of the invention is to provide a damping device that incorporates a pressurized gas reservoir within the damper to prevent cavitation and the formation of bubbles within the ER fluid thereby preventing the creation of electrical arcing within the fluid.

Another objective of the invention is to provide such a damping device suitable for automotive and industrial applications which utilizes the electrorheological fluids or magneto rheological fluids as the damping medium and which uses two spaced piston rod guide and bearing assemblies, both being positioned such that they are not immersed in the damping fluid and are external to the working chamber of the damper to prevent physical contact with the ER or MR damping fluid.

A further objective of the invention is to provide such an ER damping device which has very few moving parts and is therefore less expensive to construct and is extremely reliable.

A still further objective of the invention is to provide such an ER damping device in which the internal piston does not contact the damper body and thus can be used as the positive electrode to activate the ER fluid with the damper body acting as the ground electrode thereby allowing the positive electrode to be physically separated from the vehicle occupants or service personnel to provide a safer damping device.

Another objective of the invention is to provide such a damping device which is similar in many respects to conventional tube-type dampers as to size and means of attachment to the vehicle thereby enabling the damping device to be utilized in existing spaces intended for conventional type dampers, yet which is able to withstand greater side loading forces than heretofore believed possible with conventional dampers having only a single slide support for the piston rod.

A further objective of the invention is to provide such a damping device which is of a rugged, compact, relatively lightweight, simple design which achieves the stated objectives in a simple and efficient manner.

These objectives and advantages are obtained by the improved ER damping device of the present invention, the general nature of which may be stated as including a housing having first and second ends that form an internal fluid chamber; an axially movable piston within the housing and the fluid chamber and dividing said chamber into two separate fluid subchambers; a fluid transfer duct formed between said housing and piston providing fluid transport between said fluid subchambers on opposite sides of said piston, said fluid subchambers adapted to be filled with an electrorheological (ER) fluid; an electrode attached to one of the housing and piston for applying an electric field across at least a portion of the fluid transfer duct to increase the flow resistance of the ER fluid passing therethrough; a piston rod having first and second ends connected to the piston and extending beyond opposite ends of said piston with the first end of said piston rod being adapted to be connected to a first support structure; connection means mounted on the second end of the housing for connecting said second end of the housing to a second structure spaced from the first structure, whereby load on said damping device is supported by said housing and piston rod; first and second piston-rod guide-assemblies mounted adjacent respective ends of the housing and slidably supporting the first and second ends, respectively of the piston rod therein, said first guide assembly having a slide bushing formed with a bore for slidably receiving and supporting the first end of the piston rod therein and an elastomeric seal surrounding the piston rod and located between said slide bushing and the piston chamber to seal said slide bushing from contact with the ER fluid.

BRIEF DESCRIPTION OF THE DRAWINGS

A preferred embodiment of the invention, illustrative of the best mode in which applicants have contemplated applying the principles, is set forth in the following description and is shown in the drawings and is particularly and distinctly pointed out and set forth in the appended claims.

FIG. 1 is an elevational view of the improved ER damper;

FIG. 2 is a longitudinal sectional view of the damper shown in FIG. 1;

FIG. 4 is an enlarged sectional view taken on line 4—4, FIG. 2;

FIG. 5 is an enlarged sectional view taken on line 5—5, FIG. 2;

FIG. 6 is an enlarged sectional view taken on line 6—6. FIG. 2; and

Similar numerals refer to similar parts throughout the drawings.

DESCRIPTION OF THE PREFERRED EMBODIMENT

Figure 3:
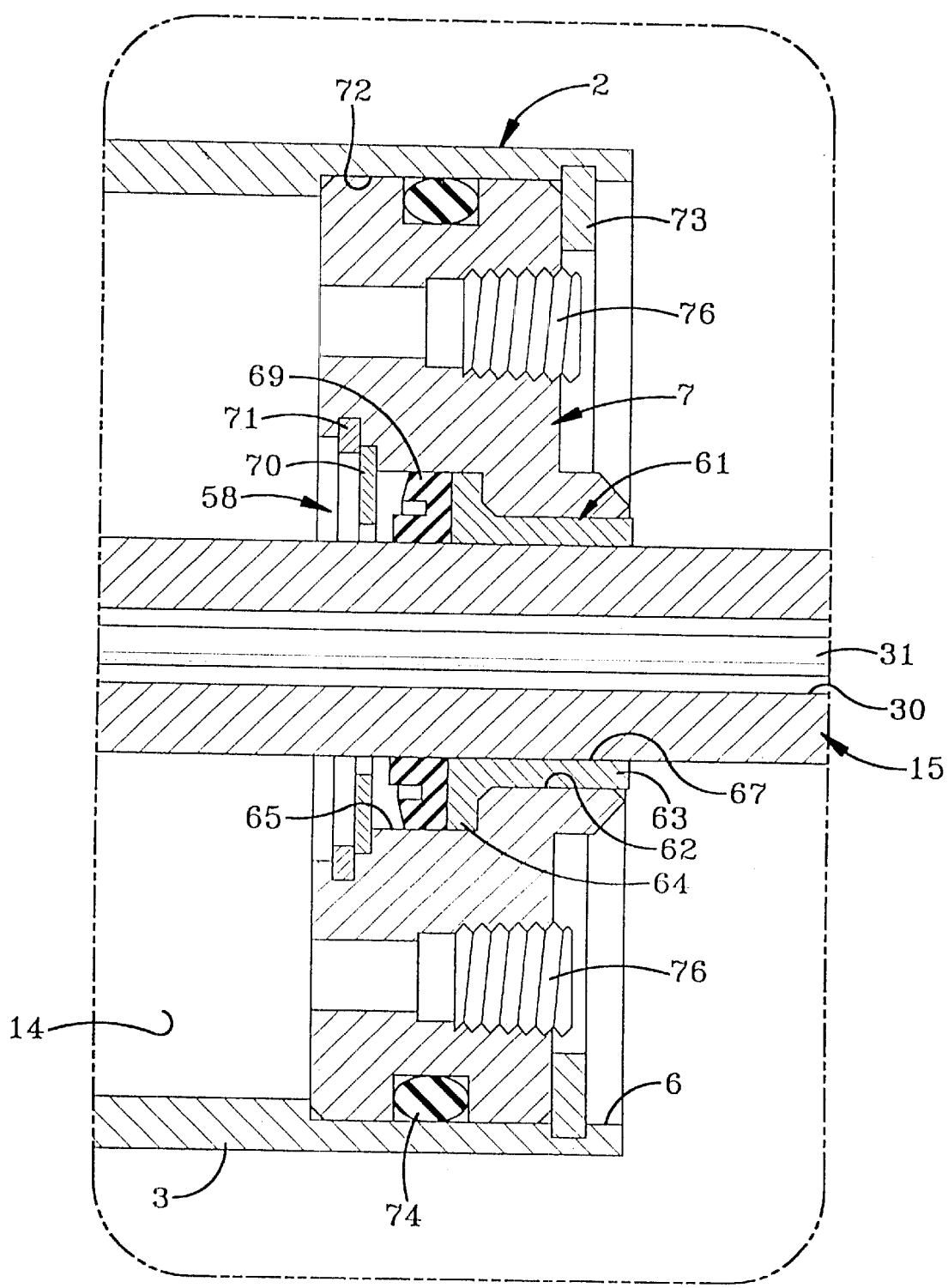
FIG. 3 is a greatly enlarged sectional view of the encircled portion of FIG. 2.

The improved vibration damping device of the present invention is indicated generally at 1, and is shown particularly in FIGS. 1 and 2. ER damper 1 includes a main cylindrical housing indicated generally at 2, preferably formed of a rigid metal. Housing 2 includes a cylindrical inner body 3 and an enlarged outer cylindrical accumulator portion 4 formed about a portion of body 3. One end of body 3 is open at 6 (FIG. 3) in which is mounted an end closure ring indicated generally at 7. The opposite end of body 3 includes a generally hollow cylindrical portion 9 extending outwardly therefrom to which is connected a U-shaped strap 10 or other type of bracket, for mounting one end of damper 1 on a spaced component 11 of a vehicle or other type of equipment.

A piston assembly indicated generally at 12, is slidably mounted within a chamber 14 formed within cylindrical body 3. Piston assembly 12 includes a piston and a piston rod indicated generally at 13 and 15 respectively. Rod 15 is attached to piston 13 and extends outwardly from opposite ends of the piston. A first end 16 of piston rod 15 extends through end closure ring 7 and beyond open end 6 of body 3 and is adapted to be connected by some type of connection such as a threaded end 18, to another component 12 of the vehicle or equipment spaced from the component to which mounting bracket 10 is attached. The opposite or second end 19 of piston rod 14 extends through the hollow interior 20 of cylindrical end portion 9. Outer cylindrical portion 4 of housing 2 forms an annular accumulator chamber 22 which extends about an outer portion of body 3 and includes a fill port 23 for filling chamber 22 with a gas or similar compressible fluid, the purpose of which is discussed further below.

In the preferred embodiment, piston 13 includes a main cylindrical body 25 formed of an electrical insulator such as a rigid plastic, and includes a cylindrical outer cover or casing 26 formed of metal or similar electrical conductive material, in order to form an electrode for applying a voltage to the ER fluid 28 which fills piston chamber 14. A central opening 30 extends from the first end 16 of piston rod 15 generally to the center of piston 13 and receives an electrical conductor 31 therethrough. Conductor 31 is electrically connected to outer cover 26 in order to impress a voltage thereon. Housing 2 is electrically grounded in some fashion such as through mounting bracket 10, enabling an electric field or voltage to be applied to an annular fluid transfer duct 33. Duct 33 is an annular passage formed between piston cover 26 and the internal surface of body 3, since in accordance with one of the features of the invention there is no sliding contact between the piston and housing. Duct 33 provides fluid transport between a pair of fluid subchambers 14A and 14B located on opposite sides of piston 13 within chamber 14. Piston rod 15 is secured to piston 13 by a pair of retaining washers 35 and snap rings 36 or other type of securing means. The opposite end of housing 2 from that of open end 6 is closed by a second end closure ring 39 (FIGS. 2 and 7) which is retained within an annular recess 40 formed in the end of housing 2, and retained therein by a retaining ring 41.

Another fluid chamber closure ring indicated generally at 43 (FIG. 7), is slidably mounted within the interior of body 3 and located between fixed end closure ring 39 and an end of piston 13. Movable closure ring 43 and fixed closure ring 39 forms an annular gas expansion chamber 45 therebetween which communicates with accumulator chamber 22 through a plurality of holes 46 formed in body 3. Movable closure ring 43 includes a cylindrical hub 48 which may be coated with a low friction material for sliding engagement with the inner annular surface 49 of closure ring 39. A pair of O-rings 50 and 51 seal closure ring 39 against the inner surface of body 2 and the outer sliding surface 53 of hub 48, respectively, to prevent the escape of gas from within chamber 45. Closure ring 43 further includes an inner annular disc-shaped body 52 having a diameter complementary to the inner diameter of body 3 and is slidably sealingly engaged therewith by a sealing O-ring 54.

In accordance with one of the main features of the invention, the first and second ends of piston rod 15 are slidably supported by a pair of piston rod guides assemblies 58 and 59 which are mounted within end closure rings 7 and 43, respectively. Piston-rod guide-assembly 58 is best shown in FIG. 3 and includes a slide bushing indicated generally at 61, which is mounted within a central opening 62 formed in closure ring 7. Bushing 61 includes a cylindrical hub 63 which terminates at its inboard end with a radial flange 64 which is seated within an annular shoulder 65 formed in end closure ring 7. The inner cylindrical surface or bore 67 of cylindrical hub 63, preferably is coated with a low friction material such as polytetrafluoroethylene, such as sold under the trademark TEFLON, or the entire bushing is made of a low friction metal such as an oil impregnated bronze, to reduce the sliding friction with the outer surface of piston rod 15. Most importantly, an elastomeric sealing ring 69 is mounted within annular shoulder 65 inboard of bushing 61, and is adjacent to and preferably in abutting engagement with the outer face of radial flange 64. Sealing ring 69 is maintained in its sealing position by a retaining washer 70 and lock ring 71. End closure ring 7 is maintained within an annular recess 72 formed adjacent to the open end 6 of body 3 by a lock ring 73. A sealing O-ring 74 prevents the escape of ER fluid from within piston chamber 14.

As can be seen in FIG. 3, the important feature obtained by piston-rod guide-assembly 58 is that the ER fluid 28 contained within chamber 14 as shown in FIG. 2, is prevented from contacting the sliding support surface between the outer surface of piston rod 15 and the low friction sliding surface of bore 67 which prevents the suspending particles of the ER fluid or other harmful components of the ER fluid from contacting the sliding surface. As previously discussed, such contact compromises the integrity of the particles in the ER fluid and the abrasive nature of the particles can erode the metal of the slide bushing and piston rod possibly resulting in leakage and an excessively loose slide mounting arrangement.

Closure ring 7 preferably is formed with a plurality of fill ports 75 through which the ER fluid is injected during assembly into chamber 14, which ports will be closed with plugs 76.

Figure 7:
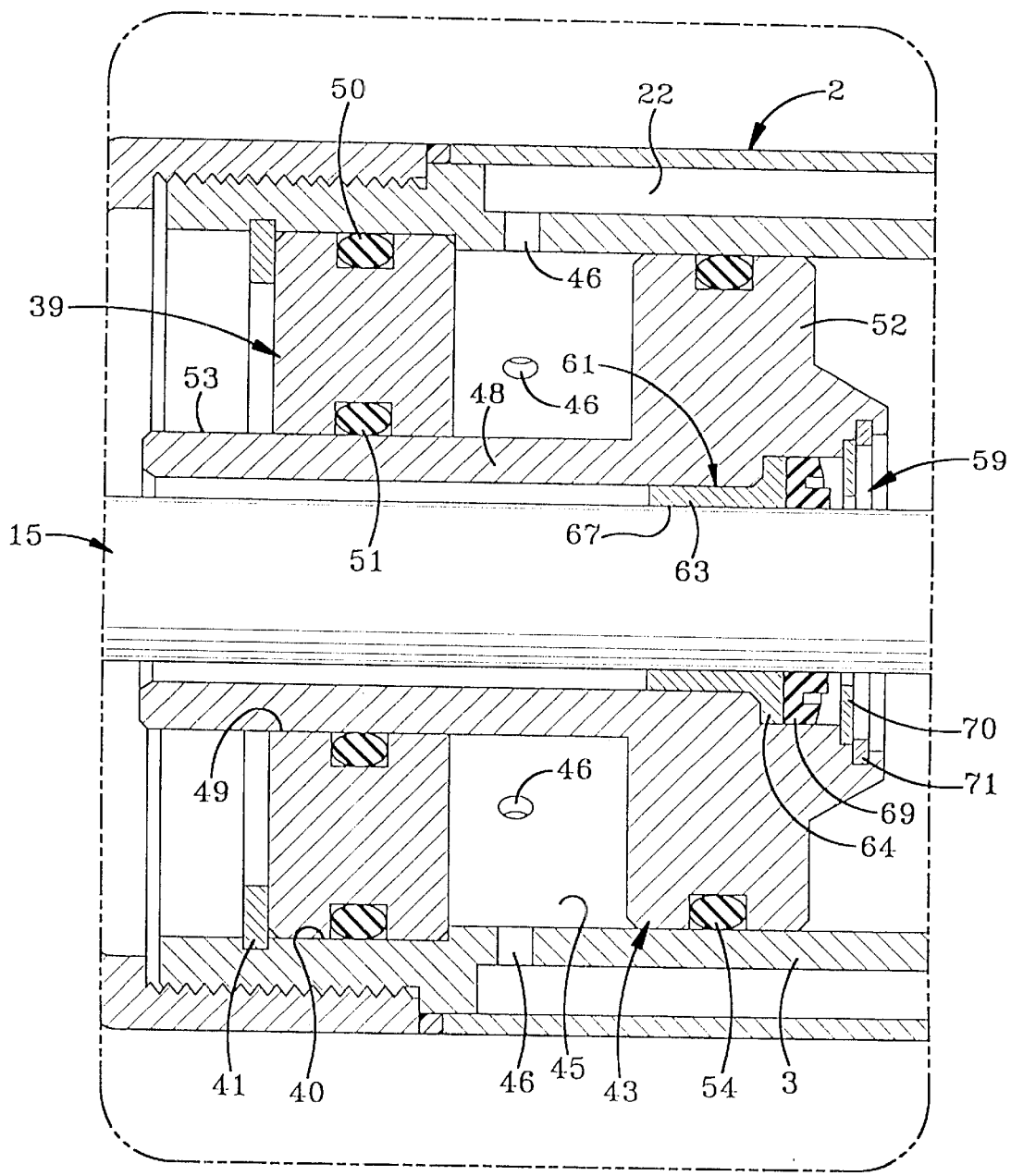
FIG. 7 is a greatly enlarged sectional view of the encircled portion of FIG. 2.

Piston-rod guide-assembly 59, which is mounted in movable closure ring 43 and is shown in detail in FIG. 7, is nearly identical to that of piston-rod guide-assembly 58 described above, and therefore is not described in further detail. The reference numbers shown in FIG. 7 correspond to those of FIG. 3 and are as described above.

The operation of ER damper 1 is best visualized in FIGS. 1 and 2. Upon the vehicle or other equipment upon which damper 1 is mounted, experiences a depression or protrusion in the roadway, the piston will move within piston chamber 14 forcing the ER fluid to move from one subchamber 14A into the other subchamber 14B, or visa versa, via fluid transfer duct 33. Upon passing through the restricted area of duct 33, a voltage can be applied to the adjacent electrode 26 via the conductor 31. This in turn causes the viscosity and yield stress of ER fluid 28 to increase dramatically depending on the amount of the applied voltage and the width of the restricted passage 33, which in turn affects the damping characteristics of the damper and is well known in the art of damping with ER fluids. The magnitude of the damping force is determined by many design parameters including the physical dimension of the damper components as well as the ER fluid rheological characteristics. It is the ER fluids ability to alter its rheological properties that gives rise to the adjustability of the damping force when electricity is applied to piston surface or cover 26 (positive electrode). In the absence of electric fields, typical ER fluids have a small viscosity and under this condition, they provide the minimum damping force in the damper. When a voltage is applied to piston 13, an electric field is formed within transfer duct 33 encompassed between the piston body and the interior surface of body 3. When exposed to this field, the ER fluid can generate significantly large stresses which result in significant enhancement in the damping force at a given imposed piston speed and the damping force with the same imposed motion is increased.

Accumulator chamber 22 in combination with gas expansion chamber 45, provides means to establish a baseline pressure within the damper and accommodates ER fluid volume change due to thermal expansion. Even though an air-over-fluid accumulator is shown in FIG. 2, the accumulator may be of any type such as a separate chamber connected to chamber 14 through one of the fill ports 76.

In accordance with the main features of the invention, ER damper 1 avoids the sliding friction between the internal piston and the internal surface of the piston chamber. The use of the piston-rod guide-assemblies provide two spaced end supports for the piston rod and correspondingly the piston, and the location of the elastomeric seals inboard of the slide support bushings of the rod guide assemblies prevent contact of the ER fluid at the areas of sliding engagement between the slide bushings and piston rod. Fluid 28 is described above as an ER or electrorheological fluid. However, it is readily understood that a magnetorheological fluid or similar field responsive fluid can be utilized without affecting the concept of the invention. Another advantage is that the application of the electric field to the internally located piston enables the outer casing of the damper to be grounded thereby providing a safer and simpler structure than that which would be achieved if the outer casing became the energized electrode. Likewise, as can be seen in FIGS. 1 and 2, the overall appearance and method of mounting the damper to spaced vehicle components is not changed from the heretofore hydraulic or gas filled shock absorbers thereby requiring no special mounting brackets or arrangement for incorporating the same into a vehicle.

Accordingly, the improved externally guided ER damper is simplified, provides an effective, safe, inexpensive, and efficient damping device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved externally guided ER damper is construed and used, the characteristics of the construction, and the advantageous, new and useful results obtained; the new and useful structures, devices, elements, arrangements, parts and combinations, are set forth in the appended claims.

What is claimed is:

1. A vibration damping device including:
   a housing having first and second ends and forming an internal piston chamber;
   a piston axially movable within the housing and piston chamber and dividing said chamber into two separate fluid subchambers;
   a fluid transfer duct formed between said housing and said piston providing fluid communication between said fluid subchambers on opposite sides of said piston, said fluid subchambers adapted to be filled with a damping fluid;
   a piston rod having first and second ends connected to the piston and extending beyond opposite ends of said piston with the first end of said piston rod being adapted to be connected to a first support structure;
   connection means mounted on the second end of the housing for connecting said second end of the housing to a second structure spaced from the first structure, whereby load on said damping device is supported by said housing and said piston rod;
   first and second piston-rod guide-assemblies mounted adjacent respective ends of the housing for slidably supporting and sealing the first and second ends, respectively of the piston rod therein, both of said piston-rod guide-assemblies including a slide bushing and an elastomeric seal mounted between said slide bushing and the piston chamber to prevent contact between the damping fluid and said slide bushings, each of the rod guide assemblies being mounted in an end closure ring mounted in respective ends of the housing with one of said closure rings being slidably mounted within the piston chamber and the other of said closure rings being fixed at an opposite end of said piston chamber; and
   an accumulator to compensate for volume changes in the piston chamber, said accumulator including a variable volume gas chamber formed adjacent one end of the piston chamber and an annular chamber surrounding at least a portion of the housing and in fluid communication with said gas chamber.

2. The vibration damping device defined in claim 1 in which the second piston-rod-guide-assembly is movably mounted within the fluid chamber of the housing and together with the first piston-rod-guide-assembly defines the piston chamber; and in which said second piston-rod-guide-assembly is axially spaced from an end closure member and forms the variable volume gas chamber therebetween.

3. The vibration damping device defined in claim 1 in which a plurality of holes are formed in the housing and extend between the annular chamber of the accumulator and the gas chamber to provide the fluid communication therebetween.

4. The vibration damping device defined in claim 1 in which each of the closure rings is formed with a central opening; and in which the piston-rod guide-assemblies are removably mounted within a respective one of said central openings.

5. The vibration damping device defined in claim 1 in which the piston includes a cylindrical body formed of plastic and an outer annular cover formed of metal.

6. The vibration damping device defined in claim 4 in which each of the closure rings is disc-shaped and includes an outer O-ring for sealing said closure ring with respect to the housing.

7. The vibration damping device defined in claim 1 in which the slide bushings each includes a cylindrical hub terminating at one end in a radial flange; and in which the elastomeric seal is abutted against said radial flange.

8. The vibration damping device defined in claim 7 in which each of the cylindrical hubs of the guide bushing assemblies is formed with a central bore having a low friction coating applied thereto.

9. The vibration damping device defined in claim 8 in which the low friction coating is a polytetrafluoroethylene (Teflon).

10. The vibration damping device defined in claim 7 in which the slide bushings are formed of a low friction metal.

11. The vibration damping device defined in claim 7 in which a retaining ring is mounted inboard of each of the elastomeric seals for retaining said seals adjacent each of the slide bushings.

* * * * *